G. W. BINGHAM.
MOVING PICTURE MACHINE.
APPLICATION FILED JAN. 8, 1912.
1,123,665.
Patented Jan. 5, 1915.
3 SHEETS—SHEET 1.
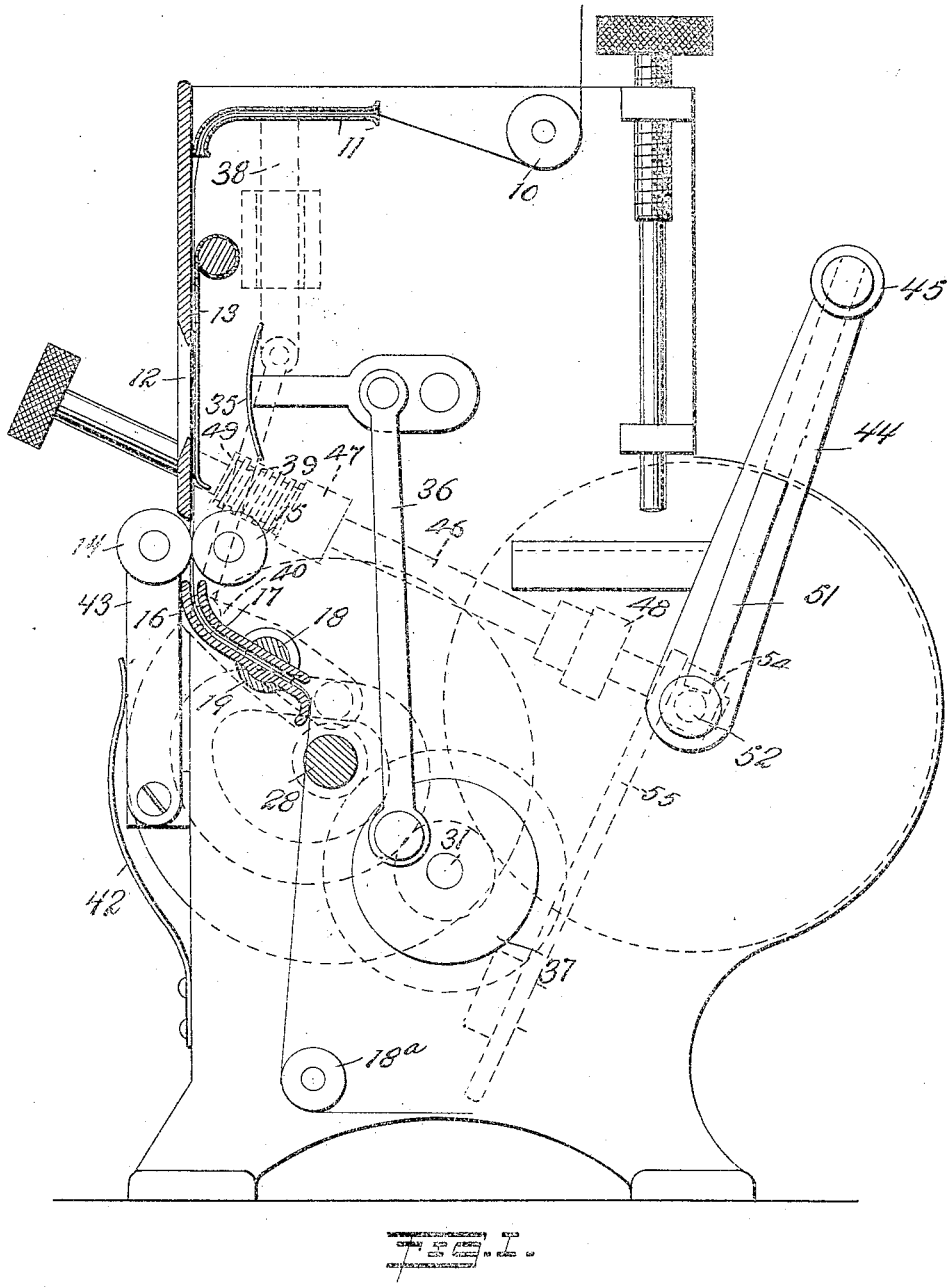

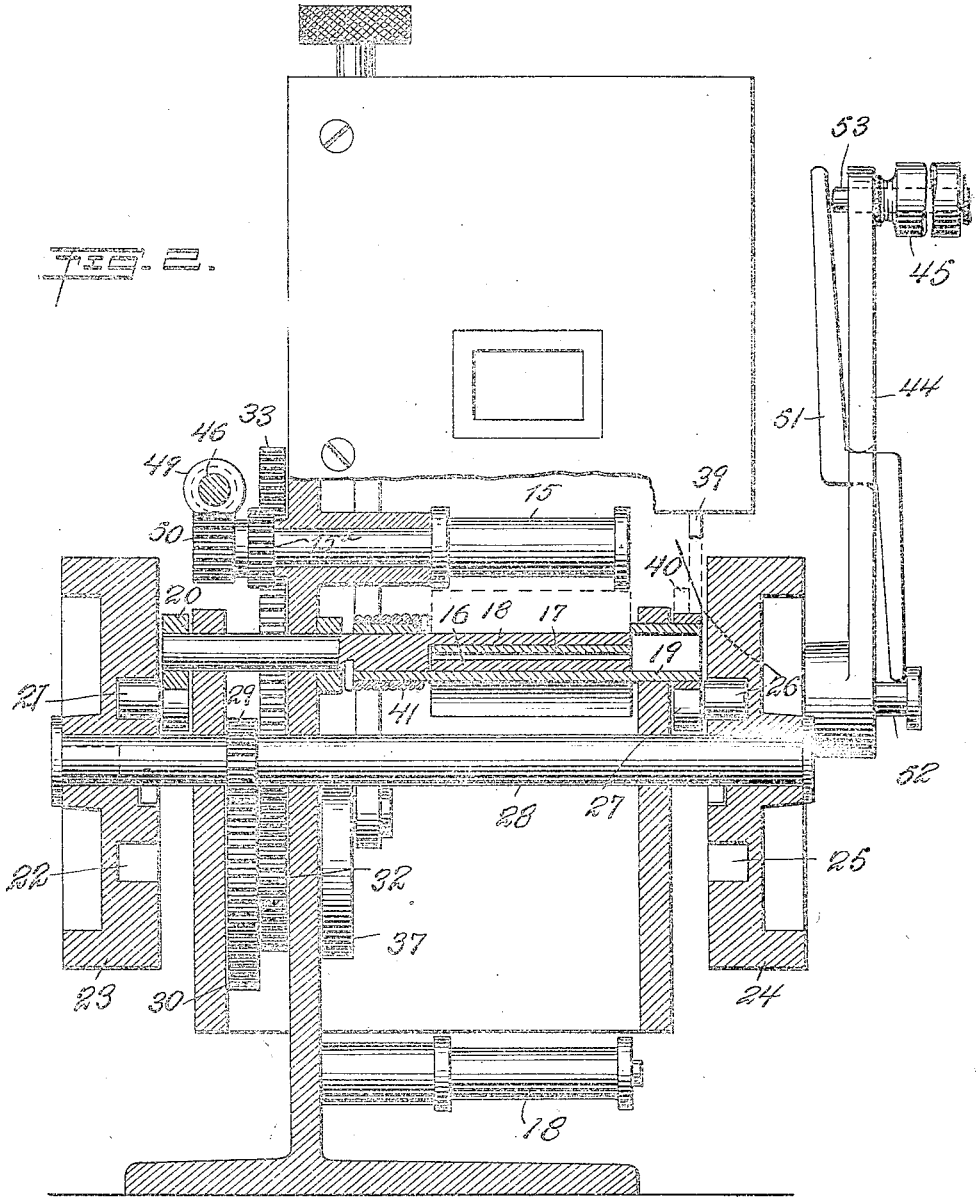

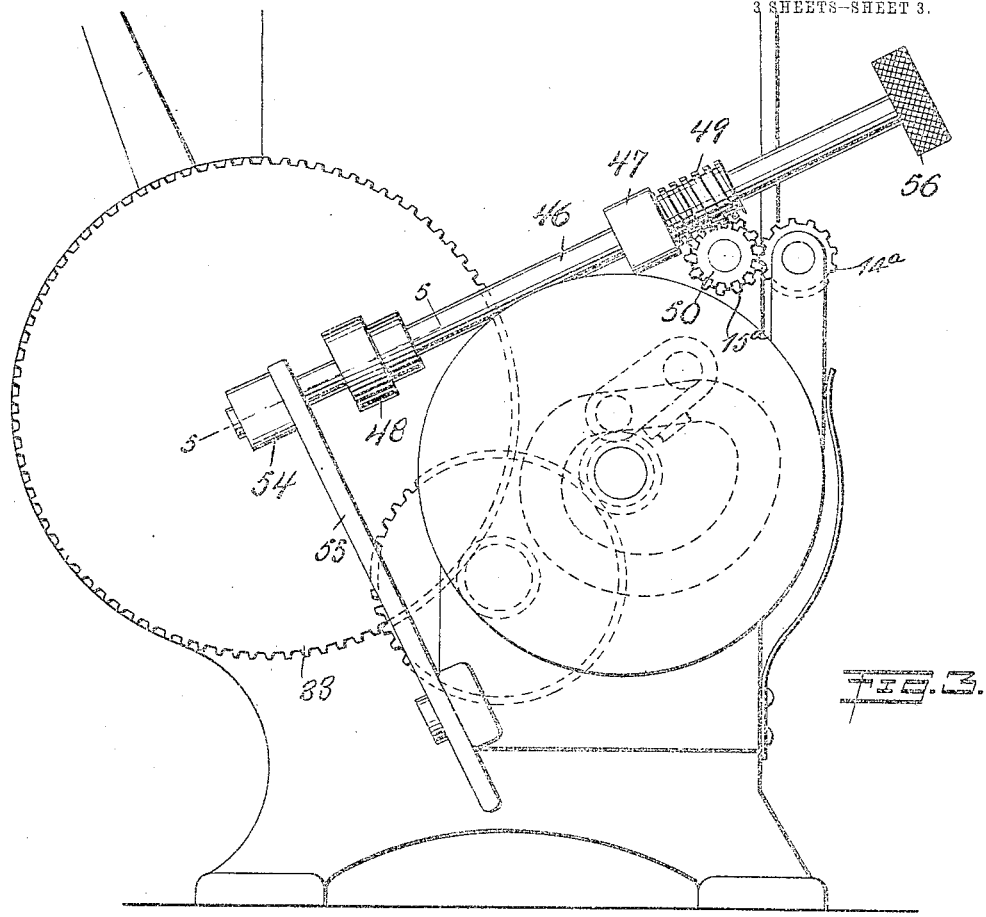
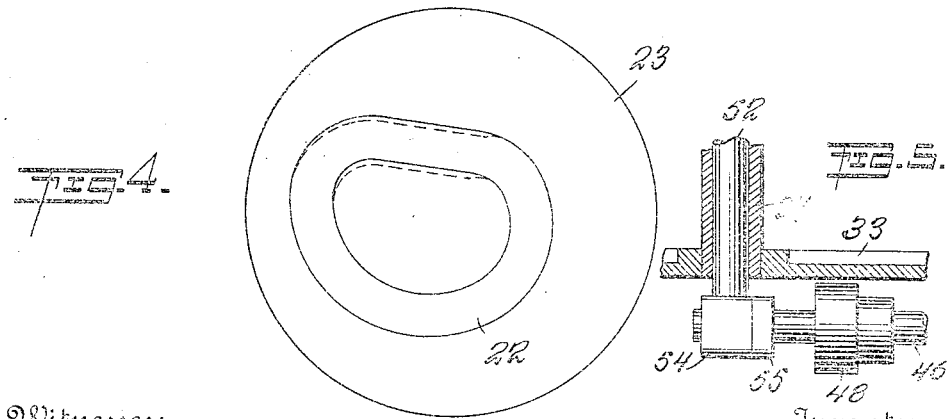

UNITED STATES PATENT OFFICE.

GEORGE W. BINGHAM, OF NEW YORK, N. Y.

MOVING-PICTURE MACHINE.

1,123,665.  Specification of Letters Patent.  Patented Jan. 5, 1915.

Application filed January 8, 1912. Serial No. 670,106.

*To all whom it may concern:*

Be it known that I, GEORGE W. BINGHAM, a citizen of the United States, and a resident of the city of New York, borough of Brooklyn, county of Kings, and State of New York, have invented certain new and useful Improvements in Moving-Picture Machines, of which the following is a full, clear, and exact description.
This invention relates to certain improvements in moving picture machines and more particularly to that type in which the film is moved intermittently past the exposure opening and permitted to remain stationary for short intervals between successive advancements.

One of the main objects of my invention is to facilitate the framing of the picture, that is, the bringing of the film into proper registry with the exposure opening, so that the edges of the exposure opening will bear the proper relationship to the picture.

A further important object of my invention is to facilitate the advancement of the film during the normal operation of the machine, so as to reduce the liability of injury to the film and insure the proper degree of advancement during each cycle of operations.

In my prior application Serial No. 656404, filed October 24, 1911, I disclosed and claimed an improved framing device, in which the crank, by means of which the machine was operated, could also be used during the normal operation of the machine for moving the film out of synchronism with the remainder of the machine and thus properly frame the picture in case of necessity. In the specific construction shown in said application, I utilized a pair of feeding rolls, which could be operated at their regular speed or could be operated at an increased speed for framing the picture. In my present invention, I utilized certain features disclosed in the said prior application but apply them to a machine in which the film is advanced by movable clamping mechanism, which grips the film during a movement in one direction and is released from it during the movement in the return direction.
One important feature of my present construction is this clamping mechanism, which includes two spaced oscillating members serving as guides, between which the film passes, and having a slight movement relative to each other to grip or release the film.

A further important feature of my present construction is the clamps which prevent the return movement of the film past the exposure opening, these clamps being in the form of rollers normally rotated only by the film as the latter passes between, but adapted for positive rotation to advance the film in framing the picture.

My invention involves various other features and important combinations of parts, which will be pointed out more particularly hereinafter and defined in the claims.

Reference is to be had to the accompanying drawings, which form a part of this specification and in which similar reference characters indicate corresponding parts in the different views.

Figure 1 is a vertical section through a machine embodying my invention. Fig. 2 is a face view of the machine, the lower portion being shown in section. Fig. 3 is an end view looking in the opposite direction from the view shown in Fig. 1. Fig. 4 is a face view of one of the cams, and Fig. 5 is a sectional detail on the line 5—5 of Fig. 3.

My invention does not in any way relate to the control of the light, the movement of the shutter or other features of the machine, with the exception of the mechanism for advancing the film either in the regular operation of the machine or in the framing of the picture. In the specific machine illustrated the film enters at the top and passes first beneath a roller 10, thence through a vertical movable guide 11, the delivery end of which projects downwardly so as to guide the film past the exposure opening 12. The film is held in close engagement with the casing wall at the exposure opening by any suitable form of spring 13; and below the exposure opening and the spring are two clamping rollers 14 and 15, the function and operation of which will be more fully pointed out hereinafter. Below the rollers are two spaced oscillating clamping members 16 and 17 between which the film passes and by the movement of which the film is caused to intermittently advance with a step by step movement. From the lower end of these members the film may pass to any suitable receiver or container and preferably passes over a roller 18ª.

The members 16 and 17 comprise an important feature of my invention as they are the means which I employ for regularly advancing the film during the normal operation of the machine. These members are pivoted about the same center and they have an oscillatory movement about that center. During the movement in one direction the two members are pressed together so as to grip the film which is between them, while during the return movement the members are spaced apart, as is shown in Fig. 1, and the film may freely slip through and be guided in the space between. The two members 16 and 17 are preferably in the form of thin plates or leaves curved so as to eliminate sharp edges which might injure the film, and the upper or receiving ends are adjacent to and directly beneath the rollers 14 and 15.

For giving the members 16 and 17 the desired movement I secure the member 17 to a rock shaft 18, a portion of which is cut away so that one side of the member passes approximately through the axis of the shaft. The other member 16 is rigidly secured to a sleeve 19 which encircles the rock shaft 18 and which sleeve is cut away to permit of the proper movement of the member 17. The rock shaft at one end has an arm 20 upon which is mounted a cam roller 21. This roller travels within a cam groove 22 in a cam wheel 23. This cam wheel may and preferably does comprise a fly wheel of the machine. Upon the opposite side of the machine is a second cam wheel 24 which may also serve as a fly wheel and which is secured to the same shaft 28 as that upon which the cam wheel 23 is mounted. In the face of the cam wheel 24 there is a cam groove 25 receiving a cam roller 26 on an arm 27 carried by the sleeve. The two cam wheels are substantially rights and lefts, that is, the two cam grooves 22 and 25 as they face each other are similar, although not exactly the same.

In Fig. 4 I have illustrated one of the cam wheels with its groove and have illustrated in dotted lines the difference between one cam groove and the other. It will be noted that throughout the major portion of the grooves they are exactly the same, so that the sleeve and the rock shaft will oscillate together, and therefore the two members 16 and 17 will move together and in spaced relationship. While the cam rollers are within the remaining portions of the grooves the slight difference between the two grooves will cause a relative movement of the sleeve and rock shaft and will cause the members 16 and 17 to approach each other and grip the film therebetween. The grooves are of such shape that the members come together to grip the film when said members are raised to the highest point and then the members rapidly swing downwardly to advance the film, while at their lowermost point they open to release the film and slowly move downwardly while the film slips through between them.

Any suitable mechanism may be employed for rotating the shaft 28 at a uniform speed and in synchronism with the other moving parts of the machine. As shown the shaft 28 carries a pinion 29 meshing with a gear 30 on an auxiliary shaft 31 and this shaft has a pinion 32 meshing with a large gear wheel 33 on a hollow main drive shaft 34. The shutter 35 of the machine may be oscillated by a link 36 one end of which is eccentrically pivoted on a disk 37 carried by a shaft 31 above referred to.

In order that there may be sufficient free film to prevent injury during the sudden pulling by the oscillating members 16 and 17 and to avoid the use of a free loop, I mount the guide 11 out of alinement with the roller 10 and exposure opening, and move this guide up and down with the oscillating members. Any suitable mechanism may be employed for this but preferably I mount the guide on a slide 38 shown in dotted lines in Fig. 1 and reciprocate the slide by a link 39, the lower end of which is connected to an oscillating arm 40 on the sleeve 19. As the film is suddenly pulled downwardly the guide 11 also moves down and the receiving end of the guide approaches the level of the lower side of the roller 10. Thus the film does not pass through the guide at any rapid rate and is not suddenly jerked over the roller 10. During the upward movement of the guide and the members 16 and 17 the film is held between the rollers 14 and 15 and prevented from moving upwardly past the exposure opening. During this time, of course, it is slowly passing through the guide and between the oscillating members. The two oscillating members 16 and 17 may rely solely upon the accurate formation of the cam grooves to properly grip the film, but preferably I employ a coil spring 41 encircling the rock shaft 18 and sleeve 19 and secured to both in such a manner as to tend to rotate the sleeve and rock shaft in respect to each other any press the members 16 and 17 toward each other. I may rely entirely upon this spring for the bringing of the clamping members together and rely upon one of the cam grooves for holding the members apart. The two rollers 14 and 15 are pressed toward each other by a spring 42, the tension of which is sufficient to cause the rollers to act as clamps and to cause the film to be advanced by the positive rotation of the rollers. The roller 15 rotates about a stationary axis while the roller 14 is carried by a spring pressed movable arm 43. This arm or the spring 42 may have an extension and the shaft 28 may have a cam operating on the extension so as to either positively separate the rollers 14 and 15 during the downward movement of the film or relieve the roller 14 from the action of the spring during this time.

The rollers 14 and 15 serve a very important function in my improved machine inasmuch as they serve not only as clamps for the film but they also serve as means for advancing the film to frame the picture. As previously stated the gear 33 is mounted upon a main hollow drive-shaft 34 which is rotated in any suitable manner. Preferably the sleeve has a crank arm 44 and a handle 45 whereby the machine may be readily operated by hand. The gear 33 is provided with a flat outer face so as to also serve as a friction gear, and a shaft 46 is mounted on the side of the machine in a bearing 47 of such a character that the shaft 46 may move bodily to a limited extent. On the shaft 46 is a friction wheel 48 adjacent to the face of the gear 33 so that the shaft 46 may be positively rotated when the friction wheel 48 is held against the face of the gear 33. The shaft 46 carries a worm 49 meshing with a worm wheel 50 on the shaft of the roller 15. The worm is closely adjacent to the bearing 47 so that the slight twisting movement of the shaft 46 does not materially affect the relationship of the worm 49 and wormwheel 50. The two rollers 14 and 15 may have intermeshing gears 14ᵃ and 15ᵃ so that the positive rotation of the roller 14 through the shaft 46 and worm will impart positive rotation to the roller 15. The pulling of the film between the rollers will not normally rotate them by reason of the gearing connected to the roller 15.

For bringing the friction wheel 48 into operation I employ somewhat the same mechanism as is disclosed in my prior application above referred to. In the present construction the crank arm 44 is provided with a lever 51, pivoted intermediate of its ends, and having one end in engagement with a rod 52 extending through the hollow shaft 34 and having the other end in engagement with a pin 53 extending through the handle 45. The opposite end of the rod 52 is mounted in a bearing 54 carried by an arm 55 pivoted on the machine and this arm at its free end also serves as a bearing for the end of the shaft 46. By pressing inwardly on the pin 53 the lever 51 pulls the rod 52 endwise and draws the friction wheel 48 against the face of the gear 43. If the crank now be turned the machine will operate to feed the film in the ordinary manner by the oscillating clamp, but at the same time the rollers 14 and 15 will be positively rotated and also act to advance the film during the upward or return movement of the clamp. This movement of the film by the rollers 14 and 15 will bring the film upward during the exposure period and thus serves to frame the picture while the machine is in operation. The same mechanism may be employed for framing the picture while the machine is at rest, as I provide the shaft 46 with a small end wheel 56 whereby the rollers 14 and 15 may be manually operated independent of the normal operation of the other parts of the mechanism.

Various changes may be made in the details of construction and within the scope of the appended claims without departing from the spirit of my invention.

Having thus described my invention what I claim as new and desire to secure by Letters Patent is:

1. A moving picture machine having a clamp for engaging with and advancing the film; clamping means including a roller normally not rotated by the film in passing thereover, and means for positively rotating said roller to frame the picture.

2. A moving picture machine having a clamp for engaging with and advancing the film, a pair of clamping rollers normally not rotated by the film in passing therebetween and means for positively rotating said rollers to frame the picture.

3. A moving picture machine having an oscillating clamp for engaging with and advancing the film, a pair of clamping rollers normally not rotated by the film in passing therebetween, and means for positively rotating said rollers to frame the picture.

4. A moving picture machine having a pair of rollers between which the film passes and normally inoperative to advance the film; means independent of said rollers for advancing the film, and means for rotating said rollers at will.

5. A moving picture machine having a pair of clamping rollers between which the film passes, an oscillating device for advancing the film and manually controlled connections whereby said rollers may be rotated during the operation of said advancing device.

6. A moving picture machine having a pair of rollers normally serving as clamps; means for advancing the film between said rollers, and means for positively rotating said rollers at will to frame the picture.

7. A moving picture machine having a pair of rollers normally serving to clamp the film, means for advancing the film between said rollers; gearing for positively rotating said rollers; and manually controlled detachable connections between said gearing and said advancing means.

8. A moving picture machine having a pair of rollers between which the film passes, a drive shaft therefor; gearing connecting said shaft with one of said rollers; means for advancing the film and detachable connections for driving said shaft from said advancing means.

9. A moving picture machine having means for advancing the film, auxiliary advancing means including a roller over which the film passes, and normally inoperative friction gearing for rotating said roller at will.

10. A moving picture machine having a pair of clamping rollers, means for rotating them to advance the film and frame the picture, and an oscillating clamp for advancing the film independently of said rollers.

11. A moving picture machine having a pair of clamping rollers; means for rotating said rollers to advance the film and frame the picture; and an oscillating clamp for engaging with the film to advance the latter, said clamp including two relatively movable members.

12. A moving picture machine having two pairs of clamps, one of said clamps being bodily movable to intermittently advance the film and the other of said clamps including relatively movable members for advancing the film to frame the picture.

13. A moving picture machine having means for advancing the film, said means including two members pivoted to oscillate about the same axis and to clamp the film by a relative oscillatory movement; and means for oscillating said members in one direction with the film clamped therebetween and in the reverse direction in spaced relationship and independent of the film.

14. A moving picture machine having a rock shaft, a sleeve encircling the same; two clamping members for engagement with the film, one of said clamping members being secured to said rock shaft, the other said members being secured to said sleeve and cams for oscillating said rock shaft and sleeve to grip the film between said members during an oscillation in one direction, and free the film during the return movement of the members.

15. A moving picture machine having an oscillatory clamp for intermittently gripping the film and advancing the same; a guide through which the film passes; a clamp intermediate of said guide and said first mentioned clamp; and means for moving said guide and said first mentioned clamp simultaneously.

16. A moving picture machine having an exposure opening, means for intermittently advancing the film past said opening, and a guide through which the film passes to said exposure opening and movable toward and from said exposure opening, one of said movements being with said film.

17. A moving picture machine having an exposure opening past which the film may move; a guide through which the film passes to said exposure opening and movable toward and from said exposure opening; and an oscillatory clamp for engaging with the film beyond said exposure opening to advance the film.

18. A moving picture machine having an exposure opening past which the film may move; a guide through which the film passes to said exposure opening and movable toward and from said exposure opening; an oscillatory clamp for engaging with the film beyond said exposure opening to advance the film; and a pair of clamping rollers intermediate of said exposure opening and said advancing means, and means for rotating them to frame the picture.

19. A moving picture machine having means for advancing the film, auxiliary advancing means including a roller over which the film passes, and normally inoperative means for rotating said roller.

20. A moving picture machine having means for advancing the film, auxiliary advancing means including a roller over which the film passes, and normally inoperative gearing for rotating said roller.

In testimony whereof I have signed my name to this specification in the presence of two subscribing witnesses.

GEORGE W. BINGHAM.

Witnesses:
 CLAIR W. FAIRBANK,
 ELEANOR T. MINOGUE.